Patented July 7, 1931

1,813,272

UNITED STATES PATENT OFFICE

WILHELM BILTZ, OF HANOVER, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

DEHYDRATION

No Drawing. Application filed January 3, 1929, Serial No. 330,132, and in Germany May 14, 1927.

This invention relates to improvements in the dehydration of solid substances such as oxides having a content of water, for example hydrogels or hydrates, or such as are moist or are swollen by the absorption of water or by a content thereof, these materials being equivalents for the purposes of the present invention.

Apart from the dehydration of solid substances by evaporation of the water contained therein, it is already known to replace the water contained in solid substances to be dried by means of liquids, which can be more easily removed than water, for example, on account of their higher volatility. Alcohol and acetone have, for example, been employed for this purpose.

I have now found that ammonia, which has been liquefied by cooling or by the application of pressure or both, dissolves water to such a high degree, even at temperatures below 0° C., that solid sustances having a content of water, such for example as hydrogels or hydrates, or such as are moist or are swollen by a content of water, for instance hydrogels of silicic acid, or oxide of silicon, can be dehydrated by being treated with liquid ammonia, for example by being washed or extracted therewith. The term dehydration includes both drying and the removal of chemically bound water.

My process has the advantage that (a) the said dehydration may be carried out at very low temperatures down to about 80° below zero C. (the point of solidification of ammonia), (b) that the dehydration agent employed according to the process of my invention is gaseous under normal conditions of temperature and pressure and that the main portion thereof can be removed from the solid to be dried without the employment of elevated temperature, by simple evaporation, and finally (c) that according to the process of my invention the original physical and chemical structure of the material to be dried remains substantially unchanged.

The process according to my invention may be carried out under any suitable conditions of temperature and pressure, at which ammonia is liquid. The dehydration may for example be carried out under elevated pressure.

The said process may also be carried out automatically and if desired continuously, for example, by the application of the Soxhleth principle.

The following example will further illustrate how my invention may be carried out in practice, but the invention is not limited thereto.

Example

A moist hydrogel of silicic acid is introduced into a closed funnel vessel provided with a filter plate. Gaseous ammonia is introduced into the funnel vessel in an amount sufficient to saturate the water contained in the hydrogel with ammonia, and the first portion of the water is thereupon filtered off by suction. The hydrogel is thereupon covered by liquid ammonia, either by liquefying ammonia in the said funnel vessel or by the introduction of liquid ammonia. The ammonia is thereupon pressed off from the hydrogel, preferably by means of the pressure set up by the vapors of the liquid ammonia itself, or by suction, and the operation is repeated so often until the liquid ammonia leaves the filter entirely free from water. The small portion of the drying agent still present in the material to be dried may be removed by evaporation.

A silicic hydrogel, prepared as described by J. Andersen in the Zeitschrift für Physikalische Chemie, vol. 88, page 191 (1914), when dried with liquid ammonia according to the process described in the above example contains only 6.5 per cent of water, whereas a hydrogel similarly prepared but subjected to "ageing" when dried in the same manner contains only 5.7 per cent of water. The preparations thus obtained are very light loose powders. During the production of the dry gels according to the manner described, these are never subjected to a temperature higher than 78.5° below zero C., in the drying process proper.

According to the methods which have hitherto been employed in the dehydration of hydrogels of silicic acid very high temperatures of up to about 300° C. had to be employed in order to obtain a gel containing between 2 and 10 per cent of water.

What I claim is:—

1. A process for the dehydration of a solid oxide containing water, which comprises treating the said oxide with liquid ammonia.

2. A process for the dehydration of a hydrogel of silicic acid, which comprises treating the said hydrogel with liquid ammonia.

3. A process for the dehydration of a hydrogel of silicic acid, which comprises extracting the water from the said hydrogel by means of liquid ammonia.

4. A process for the dehydration of a hydrogel of silicic acid, which comprises continuously and automatically extracting the water from the said hydrogel by means of liquid ammonia.

In testimony whereof I have hereunto set my hand.

WILHELM BILTZ.